(12) United States Patent
Sittig et al.

(10) Patent No.: US 9,215,289 B2
(45) Date of Patent: *Dec. 15, 2015

(54) AUDIENCE MANAGEMENT IN A SOCIAL NETWORKING SYSTEM

(71) Applicant: Facebook, Inc., Menlo Park, CA (US)

(72) Inventors: Aaron Sittig, San Francisco, CA (US); Samuel Lessin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,765

(22) Filed: May 22, 2014

(65) Prior Publication Data

US 2014/0258410 A1 Sep. 11, 2014

Related U.S. Application Data

(63) Continuation of application No. 13/179,548, filed on Jul. 10, 2011, now Pat. No. 8,756,278.

(51) Int. Cl.
| | |
|---|---|
| *G06F 15/16* | (2006.01) |
| *H04L 29/08* | (2006.01) |
| *G06Q 10/10* | (2012.01) |
| *G06F 17/30* | (2006.01) |

(52) U.S. Cl.
CPC .......... *H04L 67/22* (2013.01); *G06F 17/30867* (2013.01); *G06Q 10/10* (2013.01)

(58) Field of Classification Search
CPC .. H04L 67/22; H04L 67/306; G06F 17/30867
USPC .......................................................... 709/204
See application file for complete search history.

(56) References Cited

U.S. PATENT DOCUMENTS

| | | | | |
|---|---|---|---|---|
| 8,504,587 | B2* | 8/2013 | Athsani et al. ................ | 707/783 |
| 8,756,278 | B2* | 6/2014 | Sittig et al. ................... | 709/204 |
| 2007/0106551 | A1* | 5/2007 | McGucken ..................... | 705/10 |
| 2011/0161424 | A1* | 6/2011 | Beringer et al. .............. | 709/205 |
| 2011/0320300 | A1* | 12/2011 | Broms et al. ................. | 705/26.2 |

OTHER PUBLICATIONS

United States Office Action, U.S. Appl. No. 13/179,548, Aug. 16, 2013, ten pages.

* cited by examiner

*Primary Examiner* — Kristie Shingles
(74) *Attorney, Agent, or Firm* — Fenwick & West LLP

(57) ABSTRACT

A social networking system manages the accessibility of content items provided by users and directed to various audiences in the social networking system. An author provides the social networking system with a content item, a content item tag indicating an association between the content item and a tagged user, and a definition of a first audience who may view the content item. The social networking system then allows the tagged user to provide a definition of a second audience who may view the content item, where the second audience may contains users who are not in the first audience defined by the original author. The social networking system then determines whether a viewing user may view the posted content item (and tag) based on whether the viewing user is in at least one of the first audience and the second audience.

23 Claims, 4 Drawing Sheets

AUDIENCE MANAGEMENT IN A SOCIAL NETWORKING SYSTEM

CROSS-REFERENCE TO RELATED APPLICATION(S)

This application is a continuation of U.S. application Ser. No. 13/179,548, filed Jul. 10, 2011, which is incorporated by reference in its entirety.

BACKGROUND

This invention relates generally to social networking, and in particular to managing communications directed to various audiences in a social networking system.

A social networking system user may be an individual or any other entity, such as a business or other non-person entity. Users of social networking systems upload, view, and interact with content items within the social networking system. In this context, content items may include any kind of content that a social networking system user or other object may create, upload, edit, or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Likewise, a content item may include a statement about a social networking system object or action. For example, if a user recommends a social networking system group to another user, or if a user becomes friends with another user and posts an indication of the friendship on the social networking system, the recommendation and post are content items. Thus, a content item may be any statement, communication, or created object in the social networking system.

Social networking systems commonly provide mechanisms that allow users to interact and communicate within their social networks. For instance, a user may be able to send a content item to one or more other users. Content items may be uploaded to or created within many social networking system contexts, such as newsfeeds, user profiles, user walls, group pages, event pages, private messages, email messages, comment threads, message chains, photo albums, or any other social networking system context capable of displaying a content item. Likewise, content items may be uploaded or created external to the social networking system's primary website, for instance through partner websites and/or websites with social networking system plug-ins. Collectively, social networking system contexts capable of displaying a content item are referred to as "spaces." Administrators of a space, if any, are referred to as the "owners" of the space. Creating or uploading a content item to a space is referred to as "posting" to the space.

A group of social networking system users able to view a content item is referred to as an "audience." The social networking system user who uploads or creates a content item is referred to as the "author" of the content item. Social networking system users can associate other users with content items. Associating a user with a content item is referred to as "tagging" the user in the content item, and the user associated with a content item is referred to as the "tagged user." Entities other than user may also be tagged in a content item.

When a user is tagged in a content item, the association between the content item and the tagged user may be displayed in conjunction with the content item. For example, if a user is tagged in a message, the tagged user's name and/or a hyperlink to the user's profile may appear in connection with the message such as within the message or below it. Likewise, the association between the content item and the tagged user may be displayed in conjunction with other tagged users or content items, or may be displayed in a social networking system space, such as a user profile. Tagging may include any form of associating a user with a content item, including linking the tagged user to the content item by including a hyperlink to the profile of the tagged user, mentioning the tagged user's name in a wall post, identifying the tagged user in a photo, or any other form of association between the user and the content item both within the context of and external to a social networking system. It should be noted that tagging is not limited to an association between a person-entity and a content item, but may also include an association between a non-person entity and a content item.

Traditionally, social networking systems have allowed the author of a content item to dictate the audience for the content item, subject to the privacy rules of the space to which the content item is posted, the privacy rules of the owner of the space, and the privacy rules of any users tagged in the content item. For example, an author may upload a photo to his profile and allow all of his friends to view the photo. In this example, if the author tags a user in the photo, the photo may appear in the tagged user's profile if the tagged user's privacy settings allow tagged photos to appear in the tagger user's profile, but the photo will still be viewable only to friends of the author. In other words, the tagged user may prevent users from viewing a content item on the tagged user's profile or in another space owned by the tagged user, but current social networking systems do not allow a tagged user to expand the audience of the content item.

In social interactions outside the context of a social networking system, a speaker (e.g., the author) can make a statement (e.g., the content item) about another person (e.g., the tagged user), and the tagged user is free to repeat the statement to additional listeners irrespective of whether the author of the statement intended for the additional listeners to hear the statement. This freedom of repeating speech creates a social economy that allows the original speaker to weigh the benefit and costs of making statements prior to speaking, creating a self-monitored speech regulation environment. The benefits of this social economy may be realized in a social networking system, lowering the monitoring and filtering costs and remains a need for solutions that enable users of a social networking system to communicate in ways that more accurately reflect communications in the real world.

SUMMARY

Embodiments of the invention provide a communication management system within a social networking environment. A content item is received from an author, a member of the social networking system. The author defines a first audience of social networking system users for the content item, and creates a content item tag indicating an association between the content item and a tagged social networking system user. The tagged user defines a second audience of social networking system users for the content item. The second audience includes at least one user that is not in the first audience. If a viewing user is a member of the union of the first audience and the second audience, the content item and the content item tag are displayed to the viewing user.

The content item received from the author may be, for example, an image, a video, or a message. The first audience and the second audience may be default audiences predetermined by the author and the tagged user, respectively. In addition, the author and the tagged user may define the first audience and the second audience, respectively, by adjusting the members of predetermined default audiences. Audience definitions may be based on the friends of the author and the tagged user, based on the type of the content item, or based on the space in which the content item is posted. The content item tag may, for example, indicate that the tagged user is referenced in a message in the content item, or may indicate that the tagged user is identified as being in an image or video. Displaying the content item tag may, for example, include displaying the name or image of the tagged user near the content item or over the content item, or may include displaying a link to the tagged user's profile page near the content item.

Figure 1:
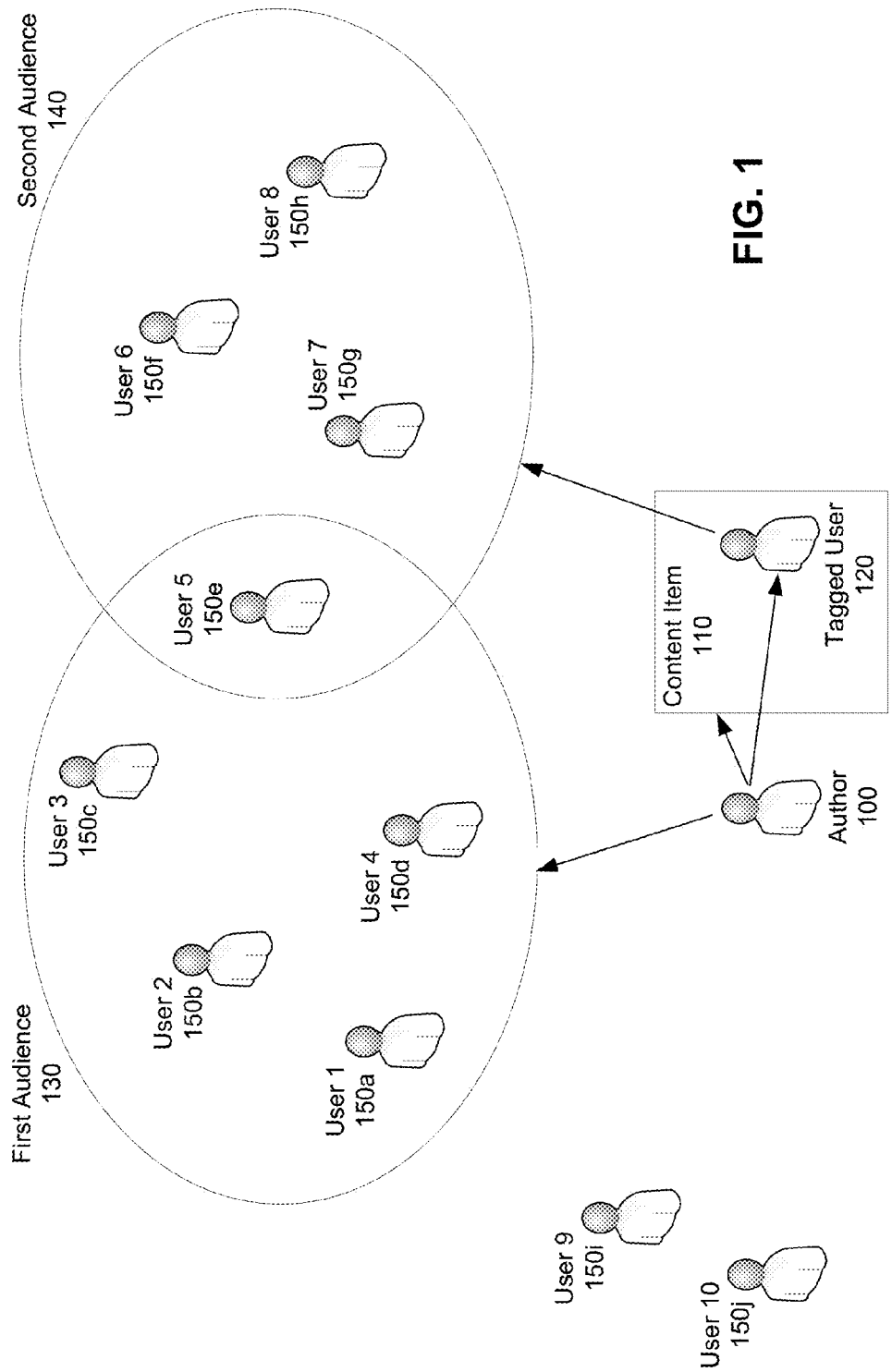
FIG. 1 is a diagram illustrating audience management for a content item in which a social networking user is tagged, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Communications a Social Networking System

Social networking systems commonly provide mechanisms that allow users to interact with objects and other users, both within and external to the context of the social networking system. A social networking system user may be an individual or any other entity, such as a business or other non-person entity. In one implementation, a social networking system may use a web-based interface comprising a series of inter-connected pages displaying and allowing users to interact with social networking system objects and information. For example, a social networking system may display a page for each social networking system user including objects and information entered by or related to the social networking system user (the user's "profile").

Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

Online social networking systems allow users to associate themselves and establish connections with other users of the social networking system. When two users establish a connection, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. In addition, becoming friends within a social networking system may allow a user greater ability communicate about another user, such as by tagging the other user in a content item uploaded by the tagging user or any other user, or by tagging the other user in an action, a group, or any other social networking system context. Finally, being friends may allow a user access to view, comment on, download, endorse or otherwise interact with another user's uploaded content items.

A social networking system object may be a social networking system user, non-person entity, content item, group, social networking system page, location, application, concept or other social networking system object, such as a movie, a band, or a book. Users of social networking systems may also interact with non-user objects within the social networking system, for instance, objects displayed on or contained within a social networking system page. This interaction may take a variety of forms, such as communicating with or about or commenting on an object, clicking a button or link associated with approval (such as a "like" button), sharing a social networking system object with other users, reposting an object to a user profile, downloading or merely viewing an object, uploading an object, linking to an object, tagging an object, editing an object, playing an object, accessing an object, or by any other suitable means for interaction. Further, a user may interact with a group or fan page object by forming or joining groups, or becoming a fan of a fan page. Finally, a social networking system user may interact with social networking system objects outside of the context of the social networking system's pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. In one embodiment, any time a user's identity is known to the social networking system, the activity of the user external to the social networking system may be shared with the social networking system.

As discussed above, tagging a user in a social networking system content item associates the tagged user with the content item. In one embodiment, a user is tagged in an content item to make the user aware of or to notify the user of the content item. For instance, if a first user discovers a social networking system group that a second user might like, the first user may tag the second user to the group, in a message about the group posted to the first user's profile, or in an email message to a group of people about the group. In one embodiment, a user is tagged in an content item about the user. For example, if a first user posts a message to the first user's profile about a second user's birthday party, the first user may tag the second user in the message. Likewise, a first user may tag a second user in a video that the second user appears in. In one embodiment, a user is tagged in an content item to request an action from the user. For instance, if a first user requests phone numbers from friends, the first user may post a note to the social networking system requesting the phone numbers of friends, and may tag the friends in order to prompt action by the friends. In one embodiment, a user tags a non-user object to a content item. For example, a user may tag a coffee in a review of the coffee shop posted to a social networking system.

Tagging allows the audience of the content item in which another user is tagged to see the association between the tagged user and the content item. "Association" as used herein, refers to relatedness between a tagged user and a content item. The association between a tagged user and a content item may be displayed within social networking system pages. For example, the association between a tagged user and a content item may be displayed in conjunction with the content item by displaying the tagged user's name, profile picture and/or a hyperlink to the user's profile near, below or over the content item. Alternatively, the association between a tagged user and a content item may be displayed in a news feed or on a user's wall. For example, the text "Mary was tagged in Bill's photo" may appear on Mary's or Bill's wall or may appear in a third-party's newsfeed in response to May being tagged in a photo uploaded by Bill.

The association between a tagged user and a content item may be displayed external to the social networking system, such as within a third-party website through a social networking system plug-in or within a non-web browsing application. For example, the text "Jimmy likes this article" may be displayed below an article appearing on a news website, along with the user Jimmy's profile picture and a link to the user Jimmy's social networking system profile page. In another example, a first user may play a game application on a mobile device, and the social networking system profile picture of a second user may be displayed within the game application in response to the second user being tagged in the game application within the social networking system or within the game application using a social networking system plug-in. In one embodiment, the association between the tagged user and the content item is not displayed, but is instead stored by the social networking system in, for example, a social graph.

A social networking system may allow users to communicate (via content items) both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on content items associated with a second user, such as content items uploaded by the second user. In addition, a user may communicate by posting a note on the user's own profile. In each of these forms of communications the author of the communication may tag another user in the communication. Tagging a user in a communication associates the tagged user with the communication, and the association may be displayed to the audience of the communication.

When a user, such as an author or a tagged user, creates or posts a content item, the user may select the audience of the content item manually or through the use of audience settings. Audience settings allow a user to designate that all content items in a particular space or context are subject to certain default audience restrictions and permissions. For example, a user may select an audience setting that restricts the audience of all the user's wall posts to friends of the user. The default audience may be based on a relationship type or a network. Examples of typical default audience settings audiences include: just the user, friends of the user, friends of friends of the user, members of particular networks, members of particular groups, users associated with a particular demographic (such as family members, classmates, employees, etc.), and everyone. Users may also create a default audience by manually selecting friends individually.

In addition to selecting a default audience, users may select a space to which the default audience applies. For example, a user may select a different default audience for each of the user's profile, the user's wall, the user's photo albums, groups administered by the user, the user's friend's walls, spaces on third party websites, etc. Audience settings may allow a user to select a particular default audience for each space in which the user is allowed to communicate. Continuing with the above example, a user may allow all friends to view user profile posts by default, but only select friends to view user photo albums by default.

Default audience settings may be overridden by an author for particular content items when the content items are posted. The audience may be manually defined based on a relationship type or a particular network. For example, if a user creates a wall post and manually restricts the audience to family members, only family members can view the wall post, despite a default audience setting that allows all friends of the user to view wall posts. After a content item is created or uploaded and audience settings are selected by the author, the author may later change the audience settings for the content item, or may remove the content item. For example, if an author initially limits the audience for a video to friends only, the author may later expand the audience to all social networking system users, or may restrict the audience to only particular friends. In addition, the author may remove the video altogether. Likewise, an author may change, add, or remove tags in a content item after the author tags another user in the content item. For example, if an author uploads a photo and tags a first user in the photo, the author may later remove the tag, change the location in the photo where the first user is tagged, or tag a second user in the photo. A tagged user may remove a tag, or may request that the author of the content item or the creator of the tag remove the tag. In one embodiment, if a user removes a tag, the author of the content item or the owner of the space in which the content item is posted is notified that the user removed the tag.

In one embodiment, the audience defined by a user is the maximum theoretical audience for a content item, and is subject to social networking system context restrictions. The type of content item may limit the audience of the content item. For example, the audience of an email may be limited to the recipients of the email, despite an audience defined as "everyone" by the sender of the email. In addition, each space may have audience settings, which may be set by the owner of the space. For example, the administrator of a group may restrict the audience of content items posted on a group wall to members of the group, despite an audience defined as "everyone" by the creator of content item. In one embodiment, the owner of the space may change the audience settings for content items on a per-content item basis.

In one embodiment, the owner or administrator of a particular space may review all content items uploaded to or created in the particular space prior to the display of the content items in the space. For example, if a first user posts a message on a second user's wall, the second user may review the message prior to the display of the message on the wall. In such an embodiment, if the second user approves of the message, the second user may allow the message to be displayed on the wall. Alternatively, if the second user finds the message offensive or otherwise disapproves of the message, the second user may deny the display of the message on the wall. Similarly, the administrator of a group may review all content items posted to the group or to a space associated with the group prior to the display of the content items.

The author of a content item may tag one or more other users to the content item. In one embodiment, the social networking system may recommend tags based on the content and the context of the content item that the author may select. The author may add or remove tags after the posting or creation of the content item. Users other than the author of a content item may tag one or more other users in the content item. In one embodiment, anyone who can view the content item may add tags to the content item. Alternatively, only users who satisfy particular criteria (such as a having a particular relationship with the author or being in a particular network) may tag other users in the content item. In one embodiment, the author of a content item may review and approve all tags in the content item by other users before the display of the tags in conjunction with the content item or the notification of any users tagged in the content item. For example, if an author posts an image to the author's profile, and a first user tags a second user in the photo, the author may review the tag prior to the display of the tag or the notification to the second user. Alternatively, an author may allow others to tag users in the author's content items, but the author may be able to remove the tag if the author disapproves of the tag. In one embodiment, an author may allow certain users to tag the author's content items without prior review of the tags by the author while tags by other users require the author's approval. For example, an author may allow all family members to tag the author's content items without the author's approval, while restricting tags from all other users.

Tagging a user in a content item may have no impact on who can view or interact with the content item. Alternatively, tagging a user in a content item may grant the user permission to view or interact with the content item. In one embodiment, tagging a user in a content item grants the tagged user as well as a set of users associated with the tagged user the ability to view or interact with the content item. In one embodiment, when a user is tagged in a content item that is available to a group, and the tagged user is not a member of the group, the social networking system may recommend that the tagged user be added to the group, and may prompt the creator of the tag or a group administrator to add the tagged user to the group.

In one embodiment, any audience member for a particular content item may repeat, or share, the content item on the audience member's wall or any other space administered or owned by the audience member. Repeating a content item may include re-posting the content item with original attribution to the author of the content item, for instance by posting the content item to the user's own profile. This gives more permanence to that tagged content item and is still under the user's control. Alternatively, an author may restrict the reposting of content items by audience members to a subset of users. In one embodiment, repeating a content item does not include re-posting the tags in the content item.

A social networking system provides many avenues for an author to communicate about another user to an audience. In one embodiment, a social networking system may allow a user to upload pictures. The social networking system may allow users to tag pictures by associating a picture or a location within the picture with the identity of a social networking system user. For example, a first user may recognize that an uploaded picture is an image of several friends, and may associate the identities of each friend with the location within the image of each friend's face. In addition, the social networking system may allow users to comment on, link to, communicate about or edit the picture. Similarly, users may upload and tag users in videos, songs, documents or any other type of content item.

A social networking system may allow users to create and schedule events. An event may have an associated real-world location, such as a concert, a party, a parade, or a sporting event, or may not have a real-world location, such as an online fundraising drive or an online sale. A social networking system may allow users to utilize social networking system calendar functionality when creating events, invite other users, and create event descriptions. Users may be tagged in events, in order to encourage users to RSVP, to remind users to bring particular items to a party, or to make the users aware of the event.

Social networking systems may allow users to use location-detection functionality in the context of the social networking system. Location-detection functionality may be implemented with, for example, a phone or other mobile device with a GPS receiver. Users may use location-detection functionality to transmit their location to a social networking system. For example, if a user attends a party, eats at a restaurant, attends a sporting event or a concert, or goes on vacation, the user may use a mobile device to verify the user's location and to transmit this location to the social networking system. This location may then be posted to a social networking system space, such as a user profile. Using location-detection functionality to verify and transmit a user location is referred to herein as "checking in" to a location. Users may also tag other users when checking in. For example, if an author checks in to a restaurant, the author may tag another user in the post, where the tag indicates that the tagged user was at the restaurant with the author.

FIG. 1 is a diagram illustrating audience management for a content item in which a social networking user is tagged, according to one embodiment. FIG. 1 illustrates an author 100 who uploads or creates a content item 110. The author 100 tags a tagged user 120 in the content item 110. In the embodiment of FIG. 1, the content item 110 may be, for example, an image uploaded by the author 100, and the tagged user 120 may be a user identified in the image. In an alternative embodiment, another user uploads the content item 110, and the author 100 tags the tagged user 120. In addition, in one embodiment, the author 100 may upload the content item 110 and another user may tag the tagged user 120. For the purposes of simplicity, the remainder of the description will be limited to the situations where the author 100 uploads or creates the content item 110 and tags the tagged user 120, though the principles described herein may apply equally to the alternative embodiments discussed above.

The author 100 defines a first audience subset 130 ("first audience") of users who may view, share, comment on, or otherwise interact with the content item 110. In the embodiment of FIG. 1, the author 100 defines the first audience 130 to include user 1 150a, user 2 150b, user 3 150c, user 4 150d, and user 5 150e. The tagged user 120 defines a second audience subset 140 ("second audience") of users who may view, share, comment on, or otherwise interact with the content item 110. In the embodiment of FIG. 1, the tagged user 120 defines the second audience 140 to include user 5 150e, user 6 150f, user 7 150g, and user 8 150h. In the embodiment of FIG. 1, the first audience 130 and the second audience 140 both include user 5 150e, though in alternative embodiments, the first audience 130 and the second audience 140 have no members in common. In one embodiment, at least one member of the second audience 140 is not a member of the first audience 130.

The total audience for content item 110 is the union of the first audience 130 and the second audience 140 (as well as the author 100 and the tagged user 120). In the embodiment of FIG. 1, users 1-8, the author 100 and the tagged user 120 can view the content item 110. In the embodiment of FIG. 1, user 9 150i and user 10 150j are not able to view the content item 110. In one embodiment, being able to view the content item 110 includes being able to view the association between the content item 110 and the tagged user 120.

In one embodiment, the tagged user 120 may define the second audience 140 without the consent or permission of the author 100. For example, if the author 100 tags the tagged user 120 in a wall post, but intends the wall post to only be visible to friends of the author 100, the author may define the first audience 130 to include only the author's friends. The tagged user 120, however, may define the second audience 140 to include users other than members of the first audience 130. Thus, while the author 100 may intend to direct the content item to a particular audience, the tagged user 120 may define the second audience 140 to include an expanded audience. In one embodiment, the author 100 cannot limit the members of the second audience 140. In an alternative embodiment, the author 100 may limit the second audience 140 to certain users (such as friends of the tagged user 120), but cannot limit the members of the second audience 140 to the members of the first audience 130.

The members of the second audience 140 may be limited by the space in which the content item 110 is posted. For example, if the author 100 posts the content item 110 to a group profile, the members of the second audience 140 may be limited to group members. Likewise, if the content item 110 is an email, the second audience 140 may be limited to a particular number of members. The owner of the space and the default social networking system rules regarding communication within a particular space may determine which social networking system users may be members of the second audience 140. In the event that the tagged user 120, the author 100 or any other user removes a tag from a content item, the audience of the content item collapses back to the first audience 130.

System Architecture

Figure 2:
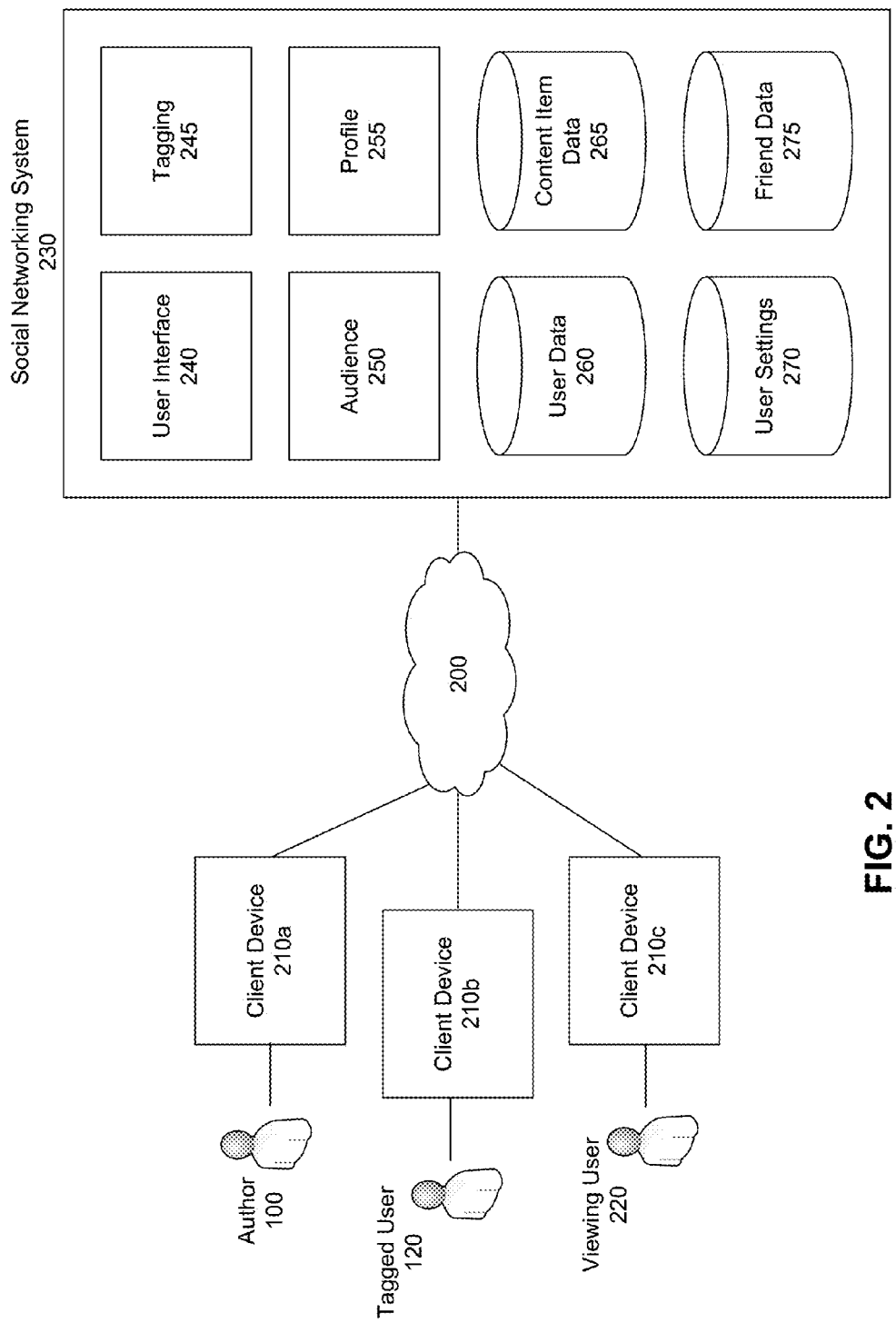
FIG. 2 is a high level block diagram of a system environment for managing the audience for a content item, according to one embodiment.

FIG. 2 is a high level block diagram of a system environment suitable for managing the audience for a content item, according to one embodiment. The system environment comprises the client devices 210a, 210b, and 210c and a social networking system 230 that communicate through a connecting network 200. The connecting network 200 may be the Internet, a local area network, or any other network that allows communication between modules. The connecting network 200 may use standard communications technologies and/or protocols. In alternative configurations, different and/ or additional modules can be included in the system.

The client devices 210 may comprise any type of computing device capable of sending or receiving social networking system content, such as a mobile phone, laptop, desktop, netbook, tablet, cable box, or television. Although only three client devices 210 are shown in FIG. 2, any number of client devices may be connected to and communicate with the social networking system 230 at a time. A user of the client device 210 interacts with the social networking system 230 via an application, such as a web browser or a native application, to perform social networking system operations such as browsing content, posting and sending messages, establishing connections with other users, and the like. In the embodiment of FIG. 2, an author 100 uses the client device 210a, a tagged user 120 uses the client device 210b, and a viewing user 220 uses the client device 210c. The viewing user 220 is a user who requests to view a content item in which tagged user 120 is tagged.

The social networking system 230 may comprise a plurality of pages hosted on one or more web servers. The plurality of pages may present social networking system information. For example, these pages may include pages for user profiles, group profiles, fan pages, and other social networking system-related pages. These pages may include a variety of social networking system data, such as personal information, user settings, group settings, search results, and advertisements, as well as object and interaction data, including but not limited to user actions, profile information, relationship information, communication information, group information, fan page information, endorsement information, and content items.

The social networking system 230 in the embodiment of FIG. 2 includes a user interface module 240, a tagging module 245, an audience module 250, and a profile module 255. In addition, the social networking system 230 includes a user data storage module 260, a content item data storage module 265, a user settings module 270, and a friend data module 275. In alternative embodiments, the social networking system 230 includes additional or fewer components.

The user interface module 240 allows a social networking system user to interact with the social networking system. For example, the user interface module 240 may display one or more social networking system pages to a client device 210, and may display social networking system data such as images, video, user profiles, etc. In one embodiment, the user interface module 240 displays pages and data in a social networking system graphical user interface (GUI). The profile module 255 allows users to create profile pages including information related to the users. For example, a user may create a profile page, and may enter biographic information, such as the user's age, birthday, school, employer, or user interest information, such as the user's favorite television shows, favorite books, etc. User information is stored in user data storage module 260. When other users request to view the user's profile page, user interface module 240 retrieves the user data from user data storage module 260 and displays the user's profile page in a social networking system GUI.

The user interface module 240 allows a user of a client device 210, such as an author 100, the ability to upload or create content items to social networking system 230. Uploaded or created content items are stored in content item data storage module 265 for subsequent display to social networking system users. The tagging module 245 allows an author 100 the ability to tag users, such as a tagged user 120, in uploaded or created content items. For example, an author 100 may use the tagging module 245 to tag a friend in a photograph, or to tag a user with whom the user has not established a connection in a post on the author's wall. Information related to the association between the tagged user 120 and the content item is also stored in content item data storage module 265.

The user interface module 240 allows social networking system users to establish connections or make friends with other users. Information related to the connections between users is stored in friend data 275. The user interface module 240 also allows users to set user settings, such as audience settings and space settings. Space settings regulate who can interact with, communicate on or view particular spaces administered by the user, such as the user's profile, the user's images, or the user's wall. For example, a user may restrict the ability to post content items to the user's wall to friends. In addition, user settings may allow a user to restrict who can tag the user in content items. User settings are stored in user settings storage module 270.

Operation

Figure 3:
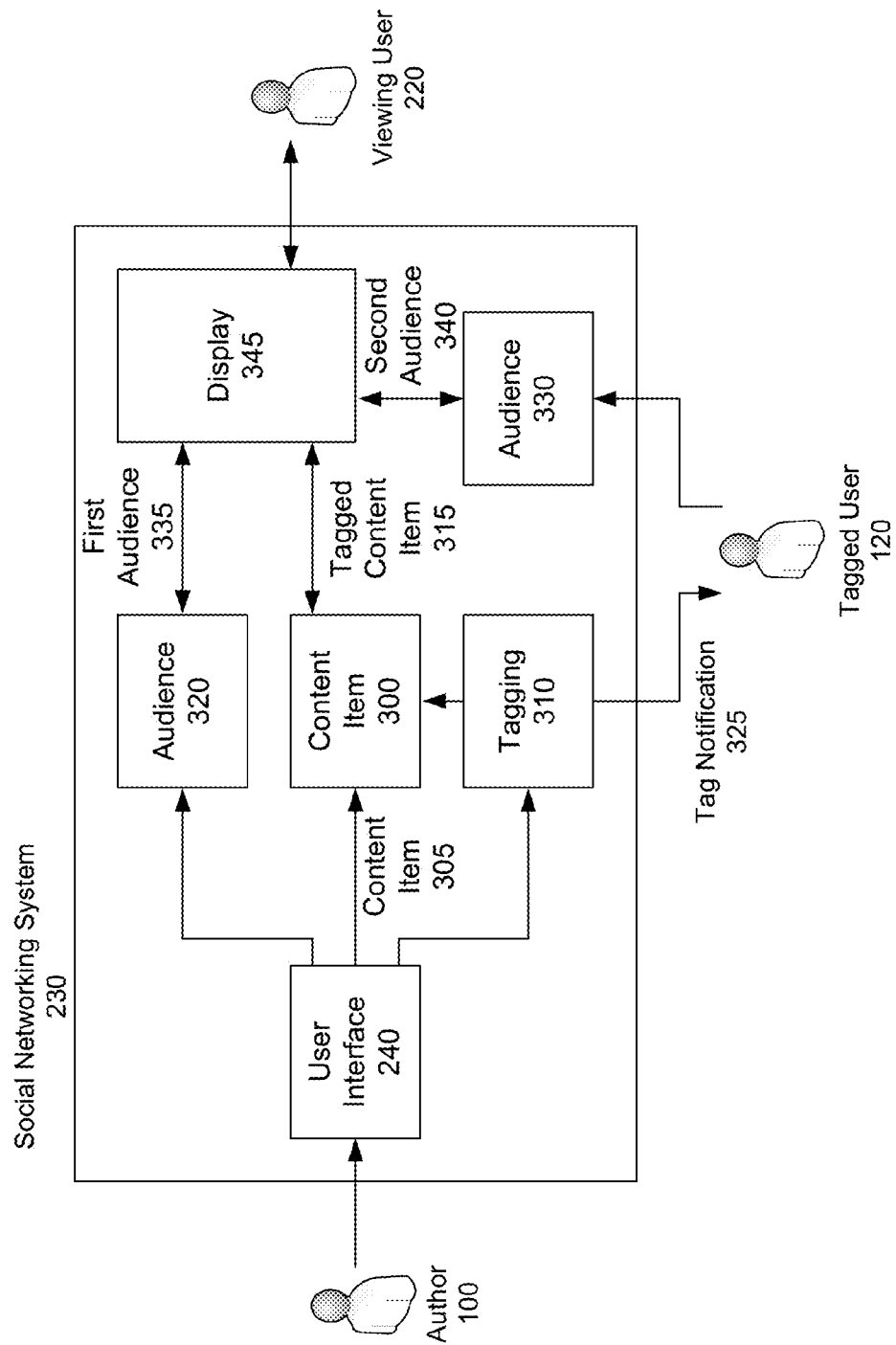
FIG. 3 is a block diagram illustrating one embodiment of the invention in which an author and a tagged user manage the audience for a content item.

FIG. 3 is a block diagram illustrating one embodiment of the invention in which an author 100 and a tagged user 120 manage the audience for a content item. The user interface module 240 allows an author 100 to upload a content item 305 to content item module 300, to tag a tagged user 120 in the content item 305 using tagging module 310, and to define an audience for the content item 305 using audience module 320. As discussed above, the content item 305 may be, for example, a message, a wall post, an image, a video, or any other type of content item. As also discussed above, the author 100 may tag another user in a content item 305 subject to the other user's user settings. Finally, the author 100 may define any subset of social networking system users as an audience for the content item 305, such as the tagged user, friends, friends of friends, or everyone.

The tagging module 310 receives tag information from the author 100 and transmits the tag information to the content item module 300 and a tag notification 325 to the tagged user 120. In one embodiment, the tag information includes the identity of the tagged user 120, the type of association between the tagged user 120 and the content item 305 (such as a tag in the body of a message, in a comment, in an image, etc.), and any content item-specific information, such as the location in a photo where the tagged user 120 is identified by the author 100. The content item module 300 receives and combines the content item 305 and the tag information associated with the content item 305 to form the tagged content item 315. The tagged content item 315 includes the content item 305 and information displaying the association between the content item 305 and the tagged user 120, such as the name or image of the tagged user 120, or a link to the tagged user's profile page.

The tagged content item 315 is sent to the display module 345 for display. It should be noted that although not shown in the embodiment of FIG. 3, the content item module 300 may receive and combine the content item 305 and the tag information associated with the content item 305 to form the tagged content item 315, and may store the tagged content item 315 (for instance, in content item data storage module 265) for subsequent retrieval and transmission to the display module 345. In one embodiment, the display module 345 requests the tagged content item 315 from the content item module 300 in response to a request from a viewing user 220, and the content item module 300 retrieves the tagged content item 315 from the content item data storage module 265 and sends the tagged content item 315 to the display module 345 in response to the display module's request.

The tagging module 310 transmits a tag notification 325 to the tagged user 120. The tag notification 325 may include information bringing the existence of the tag to the tagged user's attention. In addition, the tag notification 325 may allow the tagged user 120 to approve the tag or to reject the tag. Finally, the tag notification 325 may allow the tagged user 120 to select an audience to whom the tagged content item 315 is displayed, and may allow the tagged user 120 to select a space in which to display the tagged content item 315.

In one embodiment, the tagging module 310 transmits a tag notification 325 to the tagged user 120 outside of the context of the social networking system 230, such as via an external email or a text message. Alternatively, the tagging module 310 may transmit the tag notification 325 to the tagged user 120 within the context of the social networking system 230, such as via a social networking system email message, an instant message, a pop-up window within the social networking system GUI or external to the social networking system GUI but within a web browser, or via displayed text within the social networking system interface. For example, a tag notification 325 indicating that the tagged user 120 was tagged in the content item 305 may be displayed to the tagged user 120 in the margins of the tagged user's home page the next time the tagged user 120 logs into the social networking system 230.

The audience module 320 allows the author 100 to select a subset of social networking system users to which the tagged content item 315 is displayed. The selected subset of social networking system users is sent to the display module 345 as the first audience 335. In one embodiment, the audience module 320 only transmits the first audience 335 to the display module 345 in response to a request for the first audience 335 from the display module 345. It should be noted that although the subsets of social networking system users able to view the tagged content item 315 are referred to herein as the first audience 335 and the second audience 340, the total audience able to view the tagged content item 315 are the union of the first audience 335 and the second audience 340. Further, it should be noted that although the audience module 320 and the audience module 330 are illustrated separately in the embodiment of FIG. 3, the functionality of both may be implemented by a single module.

The tagged user 120 may respond to receiving a tag notification in a number of ways. In one embodiment, the tagged user 120 may approve or reject tags using the user interface module 240. Approving a tag may allow the association between the tagged user 120 and the content item 305 to be displayed. For example, until a tag is approved, a tagged user 120 may be able to prevent the tag from being displayed in conjunction with the content item 305. Likewise, rejecting a tag may prevent the association between the tagged user 120 and the content item 305 from being displayed. For example, if a tagged user 120 rejects a tag, the tag may not be displayed in conjunction with the content item 305. In this example, rejecting the tag does not prevent the content item 305 from being displayed, but instead merely prevents any information related to the tag and the tagged user 120 from being displayed with the content item 305. In one embodiment, approving or rejecting a tag has no effect on whether the tag is displayed.

In one embodiment, approving a tag results in the display of the tagged content item 315 in a space indicated or controlled by the tagged user 120. For example, if the author 100 tags the tagged user 120 in a note posted to the author's profile page, and the tagged user 120 approves the tag, the note may then posted to the tagged user's profile page. In this embodiment, rejecting a tag results in the tagged content item 315 not being displayed in a space indicated or controlled by the tagged user 120. In one embodiment, rejecting a tag results in the removal of displayed association between the content item 305 and the tagged user 120 from the tagged content item 315 displayed in the space indicated or controlled by the author 100, but not in the removal of the tagged content item 315 itself. For example, if an author 100 tags a tagged user 120 in an image posted to the author's profile such that when a viewing user 220 mouses over the image, the tagged user's name is displayed, and if the tagged user 120 rejects the tag, the image may not be removed from the author's profile, but the mouse-over text may be removed. In one embodiment, approving or rejecting a tag has no effect on displaying the tagged content item 315 in the space indicated or controlled by the author 100.

The tagged user 120 may allow all tagged content items 315 in which the tagged user 120 is tagged to be displayed in a space (such as the tagged user's profile page) by default without explicit acceptance of a tag by the tagged user 120. In one embodiment, the default acceptance of tags and the display of tagged content items 315 in a space designated by the tagged user 120 may be restricted to a subset of social networking system users, such as users with a particular relationship to the tagged user 120 or users in a particular network. For example, a tagged user 120 may allow all tagged content items 315 in which the tagged user 120 is tagged by friends to be displayed in the tagged user's profile page without explicit approval of the tag by the tagged user 120. In this example, the tagged user 120 may require that all tagged content items 315 in which the tagged user 120 is tagged by users other than friends to be manually approved by the tagged user 120. In one embodiment, the tagged user 120 may require tags from particular users to be approved before being displayed in a space designated by the tagged user 120.

The tagged user 120 can define a second audience 340 using the audience module 330. Similar to members of the first audience 335, members of the second audience 340 can also view, comment on or otherwise interact with the tagged content item 315. In one embodiment, the tagged user 120 may define the second audience 340 without limitation. For example, even if the author 100 selects the tagged user 120 as the only member of the first audience 335, the tagged user 120 may select any subset of social networking system users as members of the second audience 340, including friends of the author 100, friends of the tagged user 120, or everyone. In one embodiment, the tagged user 120 is a member of a defined second audience 340, and may in turn define a third audience using the audience module 330. In one embodiment, the tagged user 120 may define the second audience 340 subject to the settings of the space in which the tagged content item 315 is posted. For example, if the tagged user 120 posts the tagged content item 315 to the tagged user's profile page, the tagged user 120 may select any social networking system user subset. On the other hand, if the tagged content item 315 is displayed on the author's profile page or on a group page, the members of the second audience 340 may be restricted to friends of the author 100 or members of the group, respectively.

In one embodiment, after the tagged user 120 defines the second audience 340, the audience module 330 sends the second audience 340 to the display module 345. Alternatively, the audience module 330 may transmit the second audience 340 to the display module 345 only after the display module 345 requests the second audience 340. Both the audience module 320 and the audience module 330 may store the first audience 335 and the second audience 340, respectively, in the content item data storage module 265 in conjunction with the tagged content item 315 until requested by the display module 345.

The display module 345 receives a request for a viewing user 220 to view the tagged content item 315. In one embodiment, the viewing user 220 explicitly requests to view the tagged content item 315. For example, the viewing user 220 may receive and select a URL link to an image uploaded by the author 100 in which the tagged user 120 is tagged in order to view the image. In one embodiment, the viewing user 220 requests to view a particular social networking system space in which the tagged content item 315 is posted. For example, the viewing user 220 may request to view the profile page of the author 100 or the tagged user 120, or may request the profile page of another user or a group, or any other space. In this example, if the requested profile page or space contains the tagged content item 315, then the viewing user's request to view the page or space constitutes a request to view the tagged content item 315. Finally, in one embodiment, the viewing user 220 requests to view a news feed or other social networking system space that includes dynamically generated content. The display of the tagged content item 315 in a news feed or other space may be subject to an algorithm which determines content most relevant to the viewing user 220. If the tagged content item 315 is determined to satisfy the requirements of a news feed algorithm, then the viewing user's request to view the news feed constitutes a request to view the tagged content item 315 for the purposes of the embodiment of FIG. 3.

In one embodiment, the display of the tagged content item 315 in a news feed is affected by the interactions between the tagged user 120 and the tagged content item 315. In particular, the ranking of the tagged content item 315 among other news feed entries may be affected by whether a tagged user approves or rejects a tag. Likewise, the ranking of the tagged content item 315 may be affected based on whether the tagged user 120 displays the tagged content item 315 in the tagged user's profile, whether the tagged user 120 views the tagged content item 315, or based on any other interaction between the tagged user 120 and the tagged content item 315. The interactions between the tagged user 120 and the tagged content item 315 may affect the ranking of the tagged content item 315 based on the relationship between the tagged user 120 and the viewing user 220. For example, the interactions between the tagged user 120 and the tagged content item 315 may affect the ranking of the tagged content item 315 in the news feed of a friend or family member of the tagged user 120, or in the news feed of a viewing user 220 in the same network as the tagged user 120. In one embodiment, the interactions between the tagged user 120 and the tagged content item 315 do not affect the ranking of the tagged content item 315 in a news feed.

In response to receiving a request from a viewing user 220 to view a tagged content item 315, the display module 345 requests a first audience 335 associated with the tagged content item 315 from the audience module 320 and a second audience 340 associated with the tagged content item 315 from the audience module 330. Alternatively, the display module 345 may retrieve the first audience 335 and the second audience 340 in conjunction with retrieving the tagged content item 315. For example, if the first audience 335 and the second audience 340 are stored in the content item date storage module 265 in conjunction with the tagged content item 315, then retrieving the tagged content item 315 may include retrieving the first audience 335 and the second audience 340. In one embodiment, if the first audience 335 is retrieved and the viewing user 220 is a member of the first audience 335, then the second audience 340 is not retrieved. Likewise, if the second audience 340 is retrieved and the viewing user 220 is a member of the second audience 340, then the first audience 335 is not retrieved.

The display module 345 determines if the viewing user 220 is a member of the audience for the tagged content item 315. In one embodiment, the viewing user 220 is a member of the audience for the tagged content item 315 if the viewing user 220 is a member of the union of the first audience 335 and the second audience 340. In one embodiment, the viewing user 220 is a member of the audience of the union of the first audience 335 and the second audience 340 if the viewing user 220 is a member of the first audience 335 and/or a member of the second audience 340. In one embodiment, the display module 345 determines if the viewing user 220 is a member of the audience for the tagged content item 315 based on the space in which the tagged content item 315 is posted. For example, if the author 100 posts the tagged content item 315 onto the author's profile page, into a group operated by the author 100, into a photo album owned by the author 100, or into any other space, and the viewing user 220 requests to view the tagged content item 315 in the space in which the author 100 posted the tagged content item 315, the display module 345 may determine that the viewing user 220 is a member of the audience for the tagged content item 315 only if the viewing user 220 is a member of the first audience 335. Likewise, if the tagged user 120 posts the tagged content item 315 onto the tagged user's profile page 120 or any other space controlled by the tagged user 120, and the viewing user 220 requests to view the tagged content item 315 posted by the tagged user 120, the display module 345 may determine that the viewing user 220 is a member of the audience for the tagged content item 315 only if the viewing user 220 is a member of the second audience 340.

If the display module 345 determines that the viewing user 220 is a member of the audience for the tagged content item 315, the display module 345 displays the tagged content item 315 to the viewing user 220. In one embodiment, the display module 345 retrieves the tagged content item 315 in response to determining that the viewing user 220 is a member of the audience for the tagged content item 315. In this embodiment, the display module 345 may retrieve the tagged content item 315 from the content item data storage module 265. In one embodiment, the display module 345 retrieves the tagged content item 315 in response to receiving a request from the viewing user 220 to view the tagged content item 315, but does not display the retrieved tagged content item 315 until the display module 345 determines that the viewing user 220 is a member of the audience for the tagged content item 315.

The display module 345 may display the tagged content item 315 to a viewing user 220 determined to be a member of the audience for the tagged content item 315 in a number of ways. In one embodiment, the display module 345 displays the tagged content item 315 to the viewing user 220 in a dedicated social networking system page. For example, if the viewing user 220 requests to view a photo in which the tagged user 120 is tagged, the display module 345 may display the photo in a social networking system page GUI in which the photo and the tag are prominently displayed. Similarly, if the viewing user 220 requests to view an event in which the tagged user 120 is tagged, the display module 345 may display the event in a page dedicated to the event. In one embodiment, the display module 345 displays the tagged content item 315 to the viewing user 220 in a news feed, in a profile page, or in a wall post. In this embodiment, the tagged content item 315 is one of many content items displayed in the space. The display module 345 displays the association between the tagged user 120 and the tagged content item 315 in conjunction with the tagged content item 315. As discussed above, the association may be displayed as a text name of the tagged user 120, as a text or image link to the tagged user's profile page, or as mouse-over text.

As discussed above, a tagged user 120 may not be able to remove or override an author's tag, and tagged users 120 may include any user in the definition of the second audience 340 without receiving the permission or blessing of the author 100. To prevent instances of bullying, bullying-prevention functionality may be included. For example, the author 100 may report instances of bullying by members of the second audience 340 for review by moderators. In one embodiment, the author 100 may define particular users with whom the tagged user 120 cannot include in the definition of the second audience 340. In this embodiment, the number of users which the author 100 prevents from being members of the second audience 340 may be limited, and the identity of these users may be limited to users who performed moderator-verified instances of bullying. In one embodiment, if an author 100 has previously blocked a user from viewing the author's profile or content items, or from communicating with the author, a tagged user 120 may not include the blocked user in the definition of the second audience 340.

Figure 4:
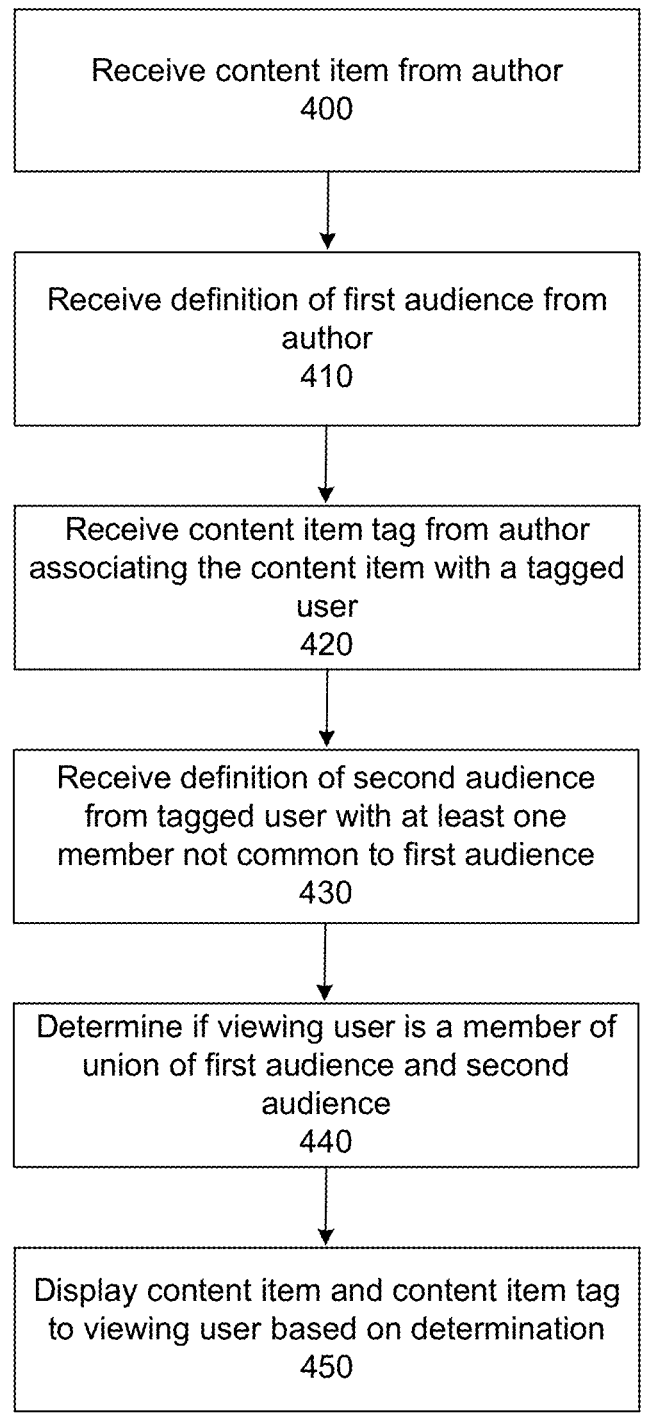
FIG. 4 is a flow chart illustrating a process for managing the audience for a content item, according to one embodiment.

FIG. 4 is a flow chart illustrating a process for managing the audience for a content item, according to one embodiment. A content item is received 400 from an author. For instance, an author may upload a photograph, create a wall post, or send a friend a message. A definition for a first audience for the content item is received 410 from the author. For example, the author may define the audience for the content item as friends of the author. A tag is received 410 for the content item, the tag associating the content item with a tagged user. The author may tag a particular friend as being shown in an uploaded photo, for instance.

A definition for a second audience for the content item is received 430 from the tagged user, where at least one member of the second audience is not a member of the first audience. For instance, the tagged user may define the second audience as friends of the tagged user if at least one friend of the tagged user is not a member of the first audience. It is determined 440 if a viewing user is a member of the union of the first audience and the second audience. This determination may be made in response to a request by the viewing user to view the content item. The viewing user is determined to be a member of the union of the first audience and the second audience if the viewing user is a member of either the first audience or the second audience, or both. The content item and the content tag are displayed 450 to the viewing user based on this determination.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving a content item from an author, the author being a user of a social networking system, the author associated with a first audience comprising one or more users of the social networking system;
    receiving a content item tag from the author, the content item tag indicating an association between the content item and a tagged user, wherein the tagged user is a user of the social networking system different than the author, the tagged user associated with a second audience comprising one or more users of the social networking system, wherein at least one user in the second audience is not in the first audience;
    determining if a viewing user is a member of a union of the first audience and the second audience; and
    sending the content item and the content item tag for display to the viewing user if the viewing user is a member of a union of the first audience and the second audience.

2. The method of claim 1, wherein the content item is uploaded to the social networking system by the author and comprises one of: an image, a video, or a message comprising text.

3. The method of claim 1, wherein the content item is displayed in a news feed of the social networking system.

4. The method of claim 1, wherein the first audience comprises a default audience predetermined by the author.

5. The method of claim 1, wherein the first audience comprises an adjustment to a default audience from the author, the default audience predetermined by the author.

6. The method of claim 1, wherein the second audience comprises a default audience predetermined by the tagged user.

7. The method of claim 1, wherein the second audience comprises an adjustment to a default audience from the tagged user, the default audience predetermined by the tagged user.

8. The method of claim 1, wherein the first audience comprises a set of users of the social networking system who have previously established a connection to the author.

9. The method of claim 1, wherein the first audience is defined based on a type of the content item.

10. The method of claim 1, wherein the first audience is defined based on a space in which the content item is posted.

11. The method of claim 1, wherein the second audience comprises a set of users of the social networking system who have previously established a connection to the tagged user.

12. The method of claim 1, wherein the second audience is defined based on a type of the content item.

13. The method of claim 1, wherein the second audience is defined based on a space in which the content item is posted.

14. The method of claim 1, wherein the second audience is defined based on a relationship between the author and the tagged user.

15. The method of claim 1, wherein display of the content item and the content item tag to the viewing user comprises display of the name of the tagged user near the content item.

16. The method of claim 1, wherein display of the content item and the content item tag to the viewing user comprises display of the name of the tagged user over the content item when the content item is selected.

17. The method of claim 1, wherein display of the content item and the content item tag to the viewing user comprises display of a link to the tagged user's profile page near the content item.

18. The method of claim 1, wherein sending the content item and the content item tag for display to the viewing user comprises displaying the content item within a social networking system space.

19. The method of claim 1, further comprising:
    receiving a second content item tag from the viewing user, the second content item tag indicating an association between the content item and a second tagged user, wherein the second tagged user is a user of the social networking system different than the author and the tagged user;
    receiving an approval for the second content item tag from the author; and
    responsive to receiving the approval for the second content item tag, sending the second content item tag for display to the viewing user if the viewing user is a member of the union of the first audience and the second audience.

20. The method of claim 1, further comprising
    generating a notification indicating that the tagged user is tagged in a content item; and
    providing the tag notification to the tagged user.

21. A computer-implemented method comprising:
    receiving a content item from an author, the author being a user of a social networking system associated with a first set of social networking system users;
    receiving a content item tag from the author, the content item tag indicating an association between the content item and a tagged user associated with a second set of social networking system users, wherein the tagged user is a user of the social networking system different than the author; and
    sending the content item and the content item tag for display to a viewing user in the second set of social networking users but not in the first set of social networking users.

22. A system comprising:

a processor; and a non-transitory computer-readable storage medium comprising computer-readable instructions for execution by the processor, the instructions, when executed by the processor, causing the system to:

receive a content item from an author, the author being a user of a social networking system, the author associated with a first audience comprising one or more users of the social networking system;

receive a content item tag from the author, the content item tag indicating an association between the content item and a tagged user, wherein the tagged user is a user of the social networking system different than the author, the tagged user associated with a second audience comprising one or more users of the social networking system, wherein at least one user in the second audience is not in the first audience;

determine if a viewing user is a member of a union of the first audience and the second audience; and send the content item and the content item tag for display to the viewing user if the viewing user is a member of a union of the first audience and the second audience.

23. A system comprising:

a processor; and a non-transitory computer-readable storage medium comprising computer-readable instructions for execution by the processor, the instructions, when executed by the processor, causing the system to:

receive a content item from an author, the author being a user of a social networking system associated with a first set of social networking system users;

receive a content item tag from the author, the content item tag indicating an association between the content item and a tagged user associated with a second set of social networking system users, wherein the tagged user is a user of the social networking system different than the author; and send the content item and the content item tag for display to a viewing user in the second set of social networking users but not in the first set of social networking users.

\* \* \* \* \*